United States Patent
Park et al.

(10) Patent No.: US 10,435,520 B2
(45) Date of Patent: Oct. 8, 2019

(54) POLYMER-HYBRID CARBON FILLER COMPOSITE AND METHOD FOR PREPARING THE SAME

(71) Applicant: KOREA INSTITUTE OF SCIENCE AND TECHNOLOGY, Seoul (KR)

(72) Inventors: Jong Hyuk Park, Seoul (KR); Min Park, Seoul (KR); Sang-Soo Lee, Seoul (KR); Heesuk Kim, Seoul (KR); Jeong Gon Son, Seoul (KR); Phillip Lee, Seoul (KR); Ji-Won You, Seoul (KR); Young Mo Lee, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 89 days.

(21) Appl. No.: 15/833,446

(22) Filed: Dec. 6, 2017

(65) Prior Publication Data

US 2019/0119454 A1    Apr. 25, 2019

(30) Foreign Application Priority Data

Oct. 19, 2017 (KR) .................. 10-2017-0135713

(51) Int. Cl.

| | |
|---|---|
| C08J 3/20 | (2006.01) |
| C08J 3/28 | (2006.01) |
| C08K 3/04 | (2006.01) |
| C08K 7/06 | (2006.01) |
| C08K 7/24 | (2006.01) |

(52) U.S. Cl.
CPC .................. *C08J 3/203* (2013.01); *C08J 3/28* (2013.01); *C08K 3/04* (2013.01); *C08K 3/041* (2017.05); *C08K 7/06* (2013.01); *C08K 7/24* (2013.01); *C08J 2377/06* (2013.01); *C08K 2201/011* (2013.01)

(58) Field of Classification Search
CPC .......... C08J 2377/06; C08J 3/203; C08J 3/28; C08K 2201/011; C08K 3/04; C08K 3/041; C08K 7/06; C08K 7/24
See application file for complete search history.

(56) References Cited

U.S. PATENT DOCUMENTS

2010/0033898 A1* 2/2010 Zhong .................. C04B 35/532
361/502

FOREIGN PATENT DOCUMENTS

| KR | 10-2003-0027219 A | 4/2003 |
|---|---|---|
| KR | 10-0448115 B1 | 9/2004 |

(Continued)

OTHER PUBLICATIONS

Tiwari et al, "Surface Treatment of Carbon Fiber—A Review", Procedia Technology 14 (2014) pp. 505-512.*

(Continued)

*Primary Examiner* — Frances Tischler
(74) *Attorney, Agent, or Firm* — Rabin & Berdo, P.C.

(57) ABSTRACT

A polyamide/hybrid carbon filler composite is disclosed. The composite includes a polyamide as a matrix and a hybrid carbon filler dispersed in and bonded to the polyamide matrix. The hybrid carbon filler is composed of a nano carbon and a carbon fiber. Also disclosed is a method for preparing the polyamide/hybrid carbon filler. The method includes simultaneously subjecting a mixture of a polyamide and a hybrid carbon filler to mechanofusion and plasma treatments.

10 Claims, 10 Drawing Sheets

(56) References Cited

FOREIGN PATENT DOCUMENTS

KR    10-1200466 B1    11/2012
KR    10-1795788 B1    11/2017

OTHER PUBLICATIONS

Shao et al, "The Cutting of Multi-Walled Carbon Nanotubes and Their Strong Interfacial Interaction with Polyamide 6 in the Solid State", Carbon 44 (2006), pp. 2708-2714.*
Youngjae Yoo et al., "Effect of graphite and carbon fiber contents on the morphology and properties of thermally conductive composites based on polyamide 6", Polym Int., 2014, pp. 151-157, vol. 63.
Weiguo Shao et al., The cutting of multi-walled carbon nanotubes and their strong interfacial interaction with polyamide 6 in the solid state, Carbon, 2006, pp. 2708-2714, vol. 44.
Roberto Scaffaro et al., "Plasma Functionalization of Multiwalled Carbon Nanotubes and Their Use in the Preparation of Nylon 6-Based Nanohybrids", Plasma Process. Polym., 2012, pp. 503-512, vol. 9.

\* cited by examiner

Example 1

FIG. 6B

POLYMER-HYBRID CARBON FILLER COMPOSITE AND METHOD FOR PREPARING THE SAME

CROSS-REFERENCE TO RELATED APPLICATIONS

This application claims priority under 35 U.S.C. § 119 to Korean Patent Application No. 10-2017-0135713 filed on Oct. 19, 2017 in the Korean Intellectual Property Office, the disclosure of which is incorporated herein by reference in its entirety.

BACKGROUND OF THE INVENTION

1. Field of the Invention

The present invention relates to a polymer-carbon filler composite and a method for preparing the same. More particularly, the present invention relates to a composite with excellent mechanical properties including a polymer and a hybrid carbon filler, and a method for preparing the composite.

2. Description of the Related Art

In recent years, environmental regulations have been getting stricter as measures against global warming. The Paris Agreement imposes obligations on signatories to reduce the release of greenhouse gas emissions into the environment. In an effort to prevent a rapid increase in the amount of greenhouse gases released by Korea, efficient use of energy resources is needed. An approach to improve the fuel efficiency of transport vehicles is receiving attention as a potential strategy to reduce the release of greenhouse gas emissions. Technologies for lightweight materials are gaining attention for fuel efficiency improvement. Particularly, recent research reveals that when currently used metallic materials are replaced by polymeric materials to reduce the weight of automobile bodies by about 30%, carbon dioxide emissions of about 5 tons can be reduced for a driving distance of 200 thousand kilometers. However, more research needs to be conducted on polymeric materials whose mechanical properties are inferior to those of metallic materials.

Composites refer to mixtures of two or more materials having different shapes and chemical compositions and can be imparted with functionalities, which could not be achieved by single materials. As a representative example, a composite with improved physical properties is known in which a reinforcing material as a filler is incorporated into a polymer as a matrix. However, when the composite is prepared by a conventional compounding process (e.g., extrusion/injection molding), its physical properties can deteriorate because of low affinity between the polymer and the filler and aggregation of the filler. Thus, the development of a new compounding process for forming direct bonds between a polymer and a filler in a composite is expected to impart high affinity between the polymer and the filler and to markedly improve the dispersibility of the filler in the composite.

PRIOR ART DOCUMENTS

Patent Documents

1. Korean Patent No. 10-0448115
2. Korean Patent Publication No. 10-2003-0027219
3. Korean Patent No. 10-1200466

SUMMARY OF THE INVENTION

The present invention intends to provide a polymer composite with excellent mechanical properties including a polymer resin and a hybrid carbon filler composed of a nano carbon and a carbon fiber, which are subjected to a mechanochemical fusion process combined with a plasma treatment so that the affinity of the polymer for the filler is increased and the dispersibility of the filler is improved.

It is, therefore, a first object of the present invention to provide a polymer composite in which a filler and a polymer are mechanochemically bonded to each other, achieving improved mechanical properties, and specifically a polyamide/hybrid carbon filler composite in which a hybrid carbon filler composed of a nano carbon and a carbon fiber is dispersed to a high degree in and mechanochemically bonded to a polyamide, achieving improved mechanical properties.

It is a second object of the present invention to provide a method for preparing the polyamide/hybrid carbon filler composite.

One aspect of the present invention provides a polyamide-carbon filler composite including a polyamide and a carbon filler dispersed in and bonded to the polyamide.

A further aspect of the present invention provides a method for preparing a polyamide-carbon filler composite, including simultaneously subjecting a mixture of a polyamide and a carbon filler to mechanofusion and plasma treatments.

According to the present invention, the composite is prepared from a mixture of a polyamide and a hybrid carbon filler composed of a nano carbon and a carbon fiber by a mechanochemical fusion process combined with in-situ plasma treatments. The filler is well dispersed and has high bonding strength to the polyamide in the composite of the present invention compared to in a conventional polyamide/nano carbon-carbon fiber composite prepared using a dry mixer, such as a Henschel mixer, a roll mill or a pin mill. Particularly, the conventional polyamide/nano carbon-carbon fiber composite suffers from poor mechanical properties because of low affinity between the polyamide and the filler. In contrast, the formation of mechanochemical bonds between the polyamide and the hybrid filler in the composite of the present invention explains markedly improved mechanical properties (particularly, markedly improved elongation) of the composite according to the present invention compared to those of the conventional polyamide/nano carbon-carbon filler composite. The polyamide/hybrid filler composite of the present invention contains a smaller amount of the filler than the conventional polyamide/nano carbon-carbon fiber composite but exhibits much higher tensile strength and elongation than the conventional polyamide/nano carbon-carbon fiber composite. Therefore, high strength and elongation of the composite according to the present invention can be achieved despite the presence of a relatively reduced amount of the filler.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Several aspects and various embodiments of the present invention will now be described in more detail.

One aspect of the present invention is directed to a polyamide-carbon filler composite including a polyamide and a carbon filler dispersed in and bonded to the polyamide.

In one embodiment, the carbon filler is composed of a carbon fiber alone or is a mixture of a carbon fiber and a nano carbon. The use of a mixture of a carbon fiber and a nano carbon as the carbon filler ensures greatly improved mechanical properties of the composite compared to the single use of a carbon fiber.

Figure 6A:
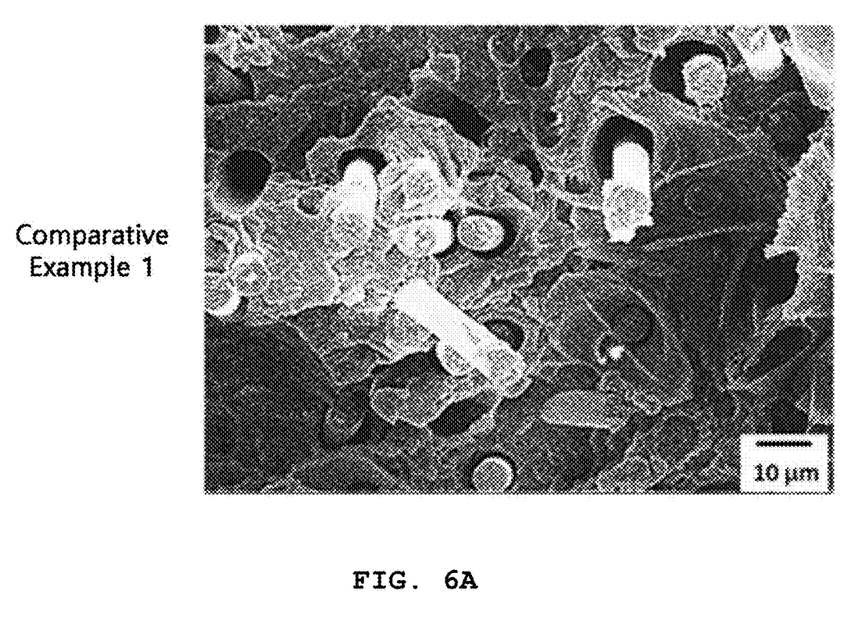
FIGS. 6A and 6B show scanning electron microscopy (SEM) images of fractures surfaces of polyamide/hybrid carbon filler composites produced using fixed amounts of a nano carbon and a carbon fiber by different compounding processes in Example 1 and Comparative Example 1.
Figure 6B:
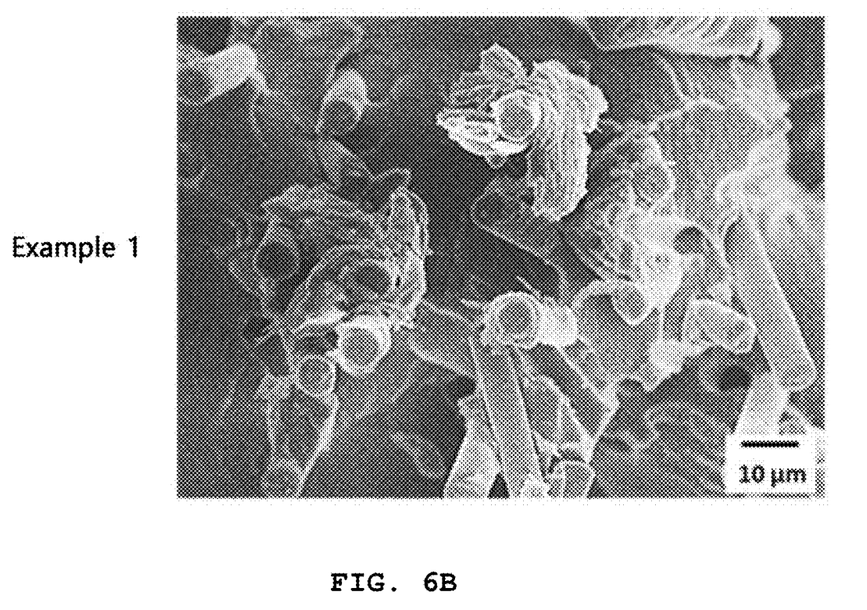

In a further embodiment, the polyamide and the carbon fiber are bonded to each other without voids at the interface therebetween when the cross-section of the composite is analyzed by scanning electron microscopy. This interfacial structure can be obtained only by simultaneous mechanofusion and plasma treatments in accordance with exemplary embodiments of the present invention. In contrast, voids are inevitably formed at the interface between a polyamide and a carbon fiber in a conventional polyamide/nano carbon-carbon fiber composite prepared by a dry mixing process, such as Henschel mixing, roll milling or pin milling. Scanning electron microscopy (SEM) images of fractured surfaces of the composite according to the present invention and a conventional polyamide/hybrid carbon filler composite prepared by roll milling are shown in FIGS. 6A and 6B.

In another embodiment, the polyamide, the carbon fiber, and the nano carbon are present in amounts of 46 to 94% by weight, 5 to 50% by weight, and 0.1 to 5% by weight, respectively.

In another embodiment, the polyamide, the carbon fiber, and the nano carbon are present in amounts of 59 to 89% by weight, 10 to 40% by weight, and 0.5 to 1.5% by weight, respectively. In another embodiment, the polyamide, the carbon fiber, and the nano carbon are present in amounts of 59 to 74% by weight, 25 to 40% by weight, and 0.5 to 1.5% by weight, respectively.

In another embodiment, the polyamide, the carbon fiber, and the nano carbon are present in amounts of 66 to 72% by weight, 27 to 33% by weight, and 0.5 to 1.5% by weight, respectively.

In another embodiment, the polyamide is selected from ring-opening polymerization products of lactam compounds, polycondensates of w-aminoundecanoic acid, polycondensates of diamines and organic acids, and blends of two or more thereof.

The nano carbon is selected from single-wall carbon nanotubes, multi-wall carbon nanotubes, double-wall carbon nanotubes, graphene, graphite, graphite nanoplatelets, carbon black, fullerenes, and mixtures of two or more thereof.

The carbon fiber is selected from long carbon fibers, short carbon fibers, and mixtures thereof.

The kind of the lactam compounds is not limited and an example thereof is ε-caprolactam. Examples of the diamines include, but are not limited to, hexamethylenediamine, tetramethylenediamine, and meta-xylenediamine. These diamines may be used alone or as a mixture of two or more thereof. The organic acids may be dibasic acids and examples thereof include, but are not limited to, adipic acid, sebacic acid, and dodecanoic acid. These organic acids may be used alone or as a mixture of two or more thereof.

Examples of preferred polyamides suitable for use in the present invention include, but are not limited to, polyamide 6, polyamide 11, polyamide 12, polyamide 46, polyamide 66, polyamide 610, and polyamide 612. These polyamides may be used alone or as a blend of two or more thereof.

A further aspect of the present invention is directed to a method for preparing a polyamide-carbon filler composite, including simultaneously subjecting a mixture of a polyamide and a carbon filler to mechanofusion and plasma treatments.

In another embodiment, the mechanofusion treatment is performed by rotating the mixture of a polyamide and a carbon filler under a pressure of 100 to 1,000 Pa.

In another embodiment, the plasma treatment is performed by applying a voltage to a chamber for the mechanofusion treatment. A gas plasma selected from nitrogen, argon, oxygen, and air plasmas may be used for the plasma treatment.

A more detailed discussion will be given concerning a method for preparing a composite according to one embodiment of the present invention. First, a polyamide powder and a carbon filler composed of a nano carbon powder and/or a carbon fiber are added to a chamber of a dry high-energy mixer. Then, a plasma is created in the chamber, and at the same time, a mechanofusion treatment is performed to prepare a composite in which the carbon filler composed of a nano carbon and/or a carbon fiber is dispersed in and mechanochemically bonded to the polyamide.

By this procedure, the surfaces of the polyamide and the carbon filler are physically modified, and at the same time, they are chemically modified with functional groups containing at least one nitrogen or oxygen atom, for example, amide, amine, hydroxyl, aldehyde, carboxyl, carbonyl, and urea groups.

The functional groups form chemical bonds, such as amide, amine, ether, carbonyl, ethylene, acetal, and urea bonds, at the interface between the polyamide and the carbon fiber.

Scanning electron microscopy of the cross-section of the composite reveals that the polyamide and the carbon fiber are bonded to each other through the chemical bonds without voids at the interface therebetween when various process conditions are precisely adjusted as described below.

In another embodiment, the pressure is from 100 to 1,000 Pa, the rotational speed is from 100 to 5,000 rpm, the voltage is from 0.5 to 5 kV, and the mechanofusion and plasma treatments are performed for 5 to 30 min.

In another embodiment, the mechanofusion and plasma treatments are performed in an atmosphere of a gas selected from nitrogen, air, argon, oxygen, and mixed gases thereof.

In another embodiment, the carbon filler is composed of a carbon fiber alone or is a mixture of a carbon fiber and a nano carbon.

In another embodiment, the polyamide, the carbon fiber, and the nano carbon are present in amounts of 46 to 94% by weight, 5 to 50% by weight, and 0.1 to 5% by weight, respectively.

In another embodiment, the polyamide, the carbon fiber, and the nano carbon are present in amounts of 59 to 89% by weight, 10 to 40% by weight, and 0.5 to 1.5% by weight, respectively.

In another embodiment, the polyamide, the carbon fiber, and the nano carbon are present in amounts of 59 to 74% by weight, 25 to 40% by weight, and 0.5 to 1.5% by weight, respectively.

In another embodiment, the polyamide, the carbon fiber, and the nano carbon are present in amounts of 66 to 72% by weight, 27 to 33% by weight, and 0.5 to 1.5% by weight, respectively.

In another embodiment, (i) the mechanofusion treatment is performed by rotating the mixture of a polyamide and a carbon filler under a pressure lower than atmospheric pressure and the plasma treatment is performed by applying a voltage to a chamber for the mechanofusion treatment, (ii) the pressure is from 300 to 1,000 Pa, the rotational speed is from 1,000 to 5,000 rpm, and the voltage is from 0.8 to 2.5 kV, (iii) the mechanofusion treatment and the plasma treatment are performed in a nitrogen atmosphere, (iv) the carbon filler is a mixture of a carbon fiber and a nano carbon, (v) the polyamide, the carbon fiber, and the nano carbon are mixed in amounts of 59 to 74% by weight, 25 to 40% by weight, and 0.5 to 1.5% by weight, respectively, and (vi) the mechanofusion treatment and the plasma treatment are performed for 5 to 30 minutes.

As a result of a lot of experiments and a great deal of trial and error on various process conditions and various combinations thereof, when all conditions (i) to (vi) are satisfied, the polyamide and the carbon fiber are bonded to each other without voids at the interface therebetween, which was confirmed by scanning electron microscopy of the cross-section of the composite. If any one of the conditions is not satisfied, voids are formed in many portions of the interface between the carbon fiber and the polyamide when the cross-section of the composite is analyzed by scanning electron microscopy. Accordingly, it is very important to satisfy all conditions (i) to (vi) in order to prevent the formation of voids at the interface between the polyamide and the carbon fiber. Furthermore, it is very important to satisfy all conditions (i) to (vi) in order to improve the mechanical properties (particularly, elongation) of the composite and to reduce the content of the carbon filler necessary to obtain the same level of mechanical properties.

Exemplary embodiments of the present invention will be more specifically described but the scope of the present invention is not to be construed as being limited to the following description of the embodiments.

The present invention is directed to a polyamide/hybrid carbon filler composite prepared from a polyamide and a hybrid carbon filler composed of a nano carbon and a carbon fiber by a mechanochemical fusion process combined with in-situ plasma treatments. The nano carbon and the carbon fiber are well dispersed in the polyamide as a matrix, ensuring improved tensile strength and markedly improved elongation of the composite according to the present invention despite the presence of a relatively reduced amount of the filler compared to those of a conventional polyamide/nano carbon-carbon fiber composite prepared using a dry mixer, such as a Henschel mixer, a roll mill or a pin mill. Due to these advantages, the composite of the present invention can be used to produce a composite material with high stiffness.

In a conventional polyamide/nano carbon-carbon fiber composite prepared by simple mixing, the filler tends to aggregate due to its poor dispersibility in the polyamide as a polymer matrix, causing phase separation. This phase separation makes it difficult to effectively transmit an external force applied to the composite, limiting the improvement of the mechanical properties of the composite.

Under these circumstances, the present inventors have found that when a polyamide, a nano carbon, and a carbon fiber are complexed by modifying their interfaces through a mechanochemical fusion process combined with in-situ plasma treatments, the mechanical properties of the resulting composite are greatly improved. The present invention has been accomplished based on this finding.

The polyamide/hybrid carbon filler composite of the present invention contains relatively small amounts of the nano carbon and the carbon fiber but exhibits markedly improved tensile strength and considerably improved elongation compared to a conventional polyamide/nano carbon-carbon fiber composite containing a large amount of the filler.

The present invention provides a polyamide/hybrid carbon filler composite including a polyamide and a hybrid carbon filler composed of a nano carbon and a carbon fiber dispersed in and mechanochemically bonded to the polyamide by mechanofusion and plasma treatments.

According to the present invention, functional groups may be formed on the surfaces of one or more of the polyamide, the nano carbon, and the carbon fiber by nitrogen, argon or oxygen atoms. The formation of functional groups can be accomplished by the plasma treatment. According to the present invention, the plasma may be a nitrogen, argon, oxygen or air plasma. The plasma is preferably a nitrogen or oxygen plasma, most preferably a nitrogen plasma.

According to the present invention, the nitrogen, argon or oxygen atoms are formed into one or more functional groups selected from amide, amine, hydroxyl, aldehyde, carboxyl, carbonyl, and urea groups on the surfaces of the polyamide and/or the nano carbon or the carbon fiber by the plasma treatment. The functional groups formed on the surfaces of the polyamide and the nano carbon or the carbon fiber form strong mechanochemical bonds between the polyamide and the hybrid carbon filler, resulting in increased affinity between the polyamide and the hybrid carbon filler and stable bonding of the polyamide to the hybrid carbon filler.

According to the present invention, the mechanochemical bonds formed between the polyamide and the hybrid carbon filler may be selected from, but not limited to, amide, amine, ether, carbonyl, ethylene, acetal, and urea bonds.

The polyamide is not limited to a specific kind and may be prepared by any suitable method known in the art. The polyamide is preferably a ring-opening polymerization product of a lactam compound, a polycondensate of w-aminoundecanoic acid, a polycondensate of a diamine and an organic acid or a blend of two or more thereof.

The lactam may be ε-caprolactam, the diamine is selected from hexamethylenediamine, tetramethylenediamine, meta-xylenediamine, and mixtures of two or more thereof, and the organic acid is selected from adipic acid, sebacic acid, dodecanoic acid, and mixtures of two or more thereof.

The polyamide is preferably polyamide 6, polyamide 11, polyamide 12, polyamide 46, polyamide 66, polyamide 610, polyamide 612 or a blend of two or more thereof.

Polyamide 6 is a ring-opening polymerization product of ε-caprolactam, polyamide 11 and Polyamide 12 are polycondensates of w-aminoundecanoic acid, polyamide 46 is a polycondensate of tetramethylenediamine and adipic acid, and polyamide 66, polyamide 610, and polyamide 612 are polycondensates of hexamethylenediamine with adipic acid, sebacic acid, and dodecanoic acid, respectively.

The nano carbon may be selected from the group consisting of single-wall carbon nanotubes, multi-wall carbon nanotubes, double-wall carbon nanotubes, graphene, graphite, graphite nanoplatelets, carbon black, fullerenes, and mixtures of two or more thereof. The carbon fiber may be selected from long carbon fibers and short carbon fibers.

The present invention also provides a method for preparing a polyamide/hybrid carbon filler composite, including 1) adding a polyamide powder, a nano carbon powder, and a carbon fiber to a chamber of a dry high-energy mixer and (2) subjecting the mixture to mechanofusion while creating a plasma in the chamber to prepare a composite in which a hybrid carbon filler composed of the nano carbon and the carbon fiber is dispersed in and mechanochemically bonded to the polyamide.

When high mechanical energy is applied to the polyamide/hybrid carbon filler composite during the mechanofusion, the polyamide and the hybrid carbon filler undergo strong shear and compressive forces, and as a result, strong thermal energy is generated between the polyamide and the hybrid carbon filler to mechanochemically bond the hybrid carbon filler to the polyamide.

The mechanical energy for the mechanofusion is adjusted such that a chamber of a mechanofusion machine rotates at a speed of 100 to 5000 rpm under an internal pressure of 100 Pa to 1000 Pa.

Particularly, a nano carbon has a strong tendency to aggregate during preparation of a composition or compound due to its poor affinity for a polymer, such as a polyamide. This tendency deteriorates the mechanical properties of the composition or compound, making it difficult to use the composition or compound in commercial applications. Further, when a polyamide is mixed with a nano carbon using a general dry mixer, such as a Henschel mixer, a difference arises in specific gravity between the polyamide and the nano carbon, and as a result, either the nano carbon is not coated or only a very small amount of the nano carbon is coated on the polyamide and a major portion of the nano carbon aggregates independently.

Thus, the present inventors have found that when a nano carbon is mechanochemically bonded to a polyamide by mechanofusion and a carbon fiber is sequentially bonded to the polyamide, the nano carbon-carbon fiber is dispersed to a high degree in the polyamide matrix.

Particularly, the present inventors have found that the production of a plasma during the mechanofusion allows the bonding of the polyamide to the nano carbon-carbon fiber with further improved interaction. The increased degree of dispersion of the nano carbon-carbon fiber and the improved bonding strength between the nano carbon-carbon fiber and the polyamide lead to a marked improvement in the mechanical properties of the composite.

According to the present invention, the plasma may be produced and the mechanofusion may be performed under a stream of air, nitrogen or oxygen, and functional groups may be formed on the surfaces of one or more of the polyamide and the nano carbon-carbon fiber by the plasma treatment.

The functional groups may be selected from amide, amine, hydroxyl, aldehyde, carboxyl, carbonyl, and urea groups. The functional groups formed on the surfaces of the polyamide and/or the nano carbon-carbon fiber increase the affinity between the polyamide and the hybrid carbon filler, form bonds selected from amide, amine, ether, carbonyl, ethylene, acetal, and urea bonds, and allow stable bonding of the polyamide to the hybrid carbon filler.

A nitrogen atmosphere may be created in the chamber at an internal pressure of 100 Pa to 1000 Pa, a voltage of 1 to 2 kV may be applied to the chamber, and the chamber may rotate at a speed of 1000 to 5000 rpm for 5 to 30 minutes.

A nitrogen atmosphere of 500 Pa may be created in the chamber, a voltage of 1 to 2 kV may be applied to the chamber, and the chamber may rotate at a speed of 2000 rpm for 10 minutes. The composite prepared under the above conditions has higher tensile strength and particularly higher tensile strain than composites prepared under other conditions.

The polyamide/hybrid carbon filler composite of the present invention can be injection molded or extruded/injection molded before use. The high degrees of dispersion of the nano carbon and the carbon fiber in the polyamide/hybrid carbon filler composite after injection molding or extrusion/injection molding ensure uniform mechanical strength and high elongation of the composite.

The present invention will be explained in more detail with reference to the following examples. However, these examples are not to be construed as limiting or restricting the scope and disclosure of the invention. It is to be understood that based on the teachings of the present invention including the following examples, those skilled in the art can readily practice other embodiments of the present invention whose experimental results are not explicitly presented. It will also be understood that such modifications and variations are intended to come within the scope of the appended claims.

The experimental results of the following examples, including comparative examples, are merely representative and the effects of the exemplary embodiments of the present invention that are not explicitly presented hereinafter can be specifically found in the corresponding sections.

EXAMPLES

Preparative Example 1

267 g of polyamide 66, 3 g of multi-wall carbon nanotubes, and 30 g of a carbon fiber were put into a chamber of a dry high-energy mixer. The chamber air was replaced with nitrogen until the nitrogen pressure reached 500 Pa. The rotational speed of the chamber was fixed to 2000 rpm and mechanofusion was performed. During mechanofusion, a voltage of 1-2 kV was applied to the chamber. A plasma was produced for 10 min in the chamber by a flow of an electric current through the nano carbon. As a result of the mechanofusion and plasma treatments, a polyamide 66/hybrid carbon filler composite was prepared.

Preparative Example 2

237 g of polyamide 66, 3 g of multi-wall carbon nanotubes, and 60 g of a carbon fiber were put into a chamber of a dry high-energy mixer. The subsequent procedure was conducted in the same manner as in Preparative Example 1.

Preparative Example 3

207 g of polyamide 66, 3 g of multi-wall carbon nanotubes, and 90 g of a carbon fiber were put into a chamber of a dry high-energy mixer. The subsequent procedure was conducted in the same manner as in Preparative Example 1.

Preparative Example 4

267 g of polyamide 66, 3 g of multi-wall carbon nanotubes, and 30 g of a carbon fiber were mixed using a 3 roll machine for 72 h to prepare a polyamide 66/nano carbon-carbon fiber composite.

Preparative Example 5

237 g of polyamide 66, 3 g of multi-wall carbon nanotubes, and 60 g of a carbon fiber were mixed using a 3 roll machine for 72 h to prepare a polyamide 66/nano carbon-carbon fiber composite.

Preparative Example 6

207 g of polyamide 66, 3 g of multi-wall carbon nanotubes, and 90 g of a carbon fiber were mixed using a 3 roll machine for 72 h to prepare a polyamide 66/nano carbon-carbon fiber composite.

Preparative Example 7

268.5 g of polyamide 66, 1.5 g of multi-wall carbon nanotubes, and 30 g of a carbon fiber were put into a chamber of a high-energy mixer. The subsequent procedure was conducted in the same manner as in Preparative Example 1.

Preparative Example 8

264 g of polyamide 66, 6 g of multi-wall carbon nanotubes, and 30 g of a carbon fiber were put into a chamber of a high-energy mixer. The subsequent procedure was conducted in the same manner as in Preparative Example 1.

Preparative Example 9

267 g of polyamide 66 and 33 g of a carbon fiber were mixed using a 3 roll machine for 72 h to prepare a polyamide 66/carbon fiber composite.

Preparative Example 10

267 g of polyamide 66 and 33 g of a carbon fiber were put into a chamber of a dry high-energy mixer. The subsequent procedure was conducted in the same manner as in Preparative Example 1.

Example 1

The polyamide 66/hybrid carbon filler composite of Preparative Example 1 was extruded through the dies of an extruder to more uniformly disperse the nano carbon adhered to the polyamide 66. The temperatures of the dies 1, 2, 3, 4, 5, 6, and 7 were set to 260, 265, 265, 265, 265, 260, and 255° C., respectively, and the screw speed was set to 80 rpm. The extrudate was cut into pellets using a pelletizer.

Then, the pellets were injection molded using an injection molding machine to produce a specimen. The injection molding conditions were as follows: temperatures of dies 1, 2, 3, and 4: 260, 260, 260, and 255° C., respectively, screw speed: 150 rpm, back pressure: 8.5 bar.

Example 2

A specimen was produced in the same manner as in Example 1, except that the polyamide 66/hybrid carbon filler composite of Preparative Example 2 was used instead of that of Preparative Example 1.

Example 3

A specimen was produced in the same manner as in Example 1, except that the polyamide 66/hybrid carbon filler composite of Preparative Example 3 was used instead of that of Preparative Example 1.

Comparative Example 1

A specimen was produced by extrusion and injection molding in the same manner as in Example 1, except that the polyamide 66/nano carbon-carbon fiber composite of Preparative Example 4 was used instead of the polyamide 66/hybrid carbon filler composite of Preparative Example 1.

Comparative Example 2

A specimen was produced by extrusion and injection molding in the same manner as in Example 1, except that the polyamide 66/nano carbon-carbon fiber composite of Preparative Example 5 was used instead of the polyamide 66/hybrid carbon filler composite of Preparative Example 1.

Comparative Example 3

A specimen was produced by extrusion and injection molding in the same manner as in Example 1, except that the polyamide 66/nano carbon-carbon fiber composite of Preparative Example 6 was used instead of the polyamide 66/hybrid carbon filler composite of Preparative Example 1.

Comparative Example 4

A specimen was produced by extrusion and injection molding in the same manner as in Example 1, except that the polyamide 66/hybrid carbon filler composite of Preparative Example 7 was used instead of the polyamide 66/hybrid carbon filler composite of Preparative Example 1.

Comparative Example 5

A specimen was produced by extrusion and injection molding in the same manner as in Example 1, except that the polyamide 66/hybrid carbon filler composite of Preparative Example 8 was used instead of the polyamide 66/hybrid carbon filler composite of Preparative Example 1.

Comparative Example 6

A specimen was produced by extrusion and injection molding in the same manner as in Example 1, except that the polyamide 66/carbon fiber composite of Preparative Example 9 was used instead of the polyamide 66/hybrid carbon filler composite of Preparative Example 1.

Comparative Example 7

A specimen was produced by extrusion and injection molding in the same manner as in Example 1, except that the polyamide 66/carbon fiber composite of Preparative Example 10 was used instead of the polyamide 66/hybrid carbon filler composite of Preparative Example 1.

Test Example 1: Measurement of Mechanical Properties

The compositions of the specimens produced in Examples 1-3 and Comparative Examples 1-7 are summarized in Table 1. The tensile strengths, tensile strains, and Young's moduli of the specimens were measured using a universal testing machine (UTM). The results are shown in Table 2 and FIGS. 2A to 2D.

TABLE 1

| Machine and components used | Mixing machine | Polyamide 66 (g) | Multi-wall carbon nanotubes (g) | Carbon fiber (g) |
|---|---|---|---|---|
| Example 1 | Dry high-energy mixer | 267 | 3 | 30 |
| Example 2 | Dry high-energy mixer | 237 | 3 | 60 |
| Example 3 | Dry high-energy mixer | 207 | 3 | 90 |
| Comparative Example 1 | 3 roll machine | 267 | 3 | 30 |
| Comparative Example 2 | 3 roll machine | 237 | 3 | 60 |
| Comparative Example 3 | 3 roll machine | 207 | 3 | 90 |
| Comparative Example 4 | Dry high-energy mixer | 268.5 | 1.5 | 30 |
| Comparative Example 5 | Dry high-energy mixer | 264 | 6 | 30 |
| Comparative Example 6 | 3 roll machine | 267 | 0 | 33 |
| Comparative Example 7 | Dry high-energy mixer | 267 | 0 | 33 |

TABLE 2

| Mechanical properties | Tensile strength (MPa) | Young's modulus (MPa) | Tensile strength (%) |
|---|---|---|---|
| Example 1 | 213 ± 2 | 11361 ± 451 | 4.3 ± 0.3 |
| Example 2 | 237 ± 3 | 12837 ± 380 | 5.0 ± 0.3 |
| Example 3 | 253 ± 3 | 13611 ± 634 | 5.2 ± 0.3 |
| Comparative Example 1 | 134 ± 2 | 4713 ± 235 | 2.8 ± 0.1 |
| Comparative Example 2 | 164 ± 3 | 8147 ± 130 | 3.1 ± 0.4 |
| Comparative Example 3 | 182 ± 2 | 9024 ± 172 | 3.3 ± 0.3 |
| Comparative Example 4 | 198 ± 5 | 10134 ± 780 | 4.3 ± 0.5 |
| Comparative Example 5 | 204 ± 2 | 10597 ± 267 | 4.3 ± 0.2 |
| Comparative Example 6 | 136 ± 4 | 4998 ± 125 | 3.0 ± 0.3 |
| Comparative Example 7 | 152 ± 3 | 6509 ± 470 | 3.8 ± 0.3 |

The tensile strengths and tensile strains of the specimens of Examples 1-3 and Comparative Examples 1-3, which were produced under the same injection molding conditions, were compared. As can be seen from the results in Table 2 and FIGS. 2A to 2D, the specimens of Examples 1-3 showed much higher tensile strengths and tensile strains compared to the specimens of Comparative Examples 1-3. Based on these results, it can be concluded that the polyamide 66/hybrid carbon filler composite prepared by the mechanochemical fusion process had better mechanical properties than the conventional polyamide 66/nano carbon-carbon fiber composite having the same composition. The specimen of Example 1 had a high tensile strength compared to the specimens of Comparative Examples 4 and 5. These results suggest the presence of an optimal amount of the nano carbon in the hybrid carbon filler. The tensile strengths of the specimens of Comparative Examples 6 and 7 were not higher than that of the specimen of Example 1. These results indicate that the composite prepared using the hybrid filler composed of the nano carbon and the carbon fiber had better mechanical properties than the composites prepared using the carbon fiber alone.

Test Example 2: Differential Scanning Calorimetry

The melting points of the polyamide 66/hybrid carbon filler composites were measured by differential scanning calorimetry. The results are shown in FIG. 3.

Figure 1:
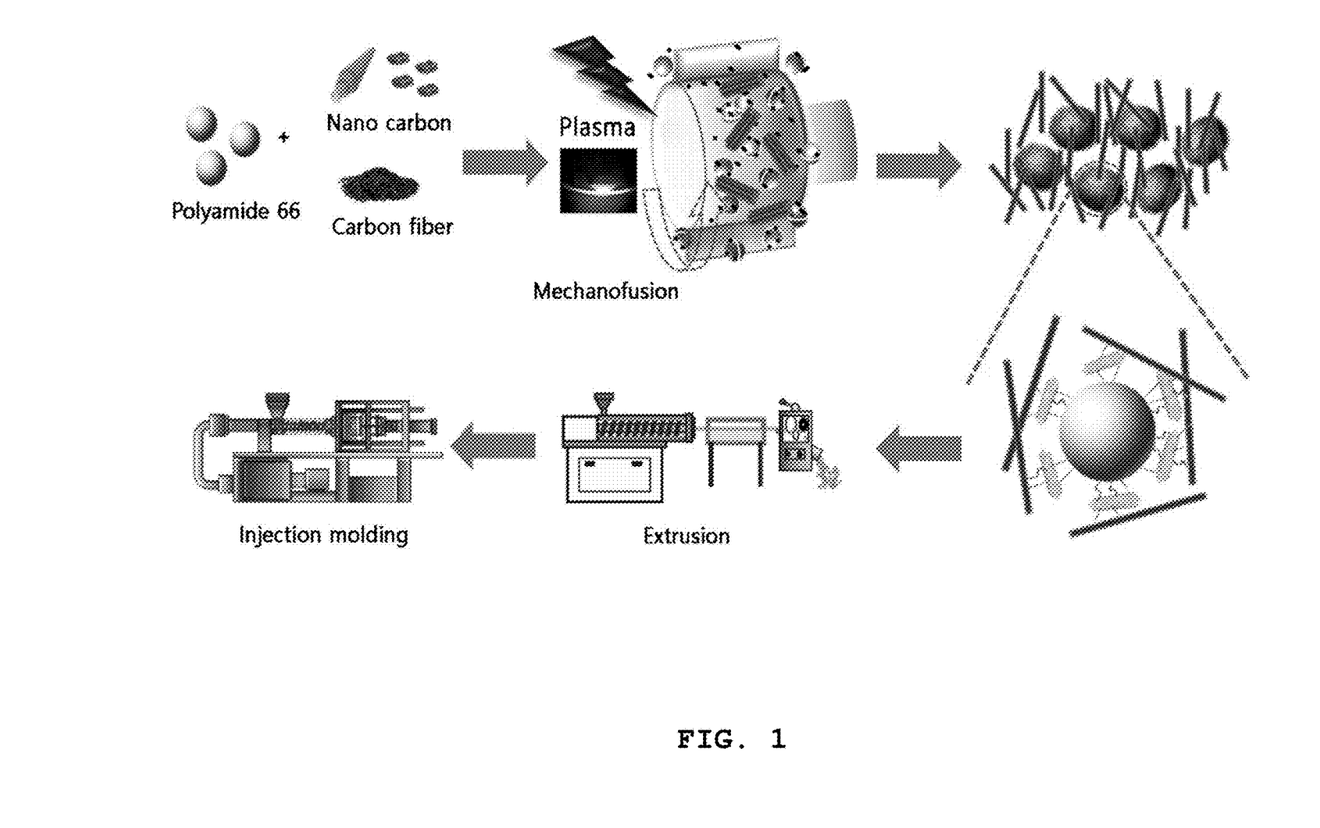
FIG. 1 is a schematic diagram showing a procedure for preparing a polyamide/hybrid carbon filler composite by subjecting a polyamide and a nano carbon-carbon fiber to a mechanochemical fusion process combined with in-situ plasma treatments.
Figure 2A:
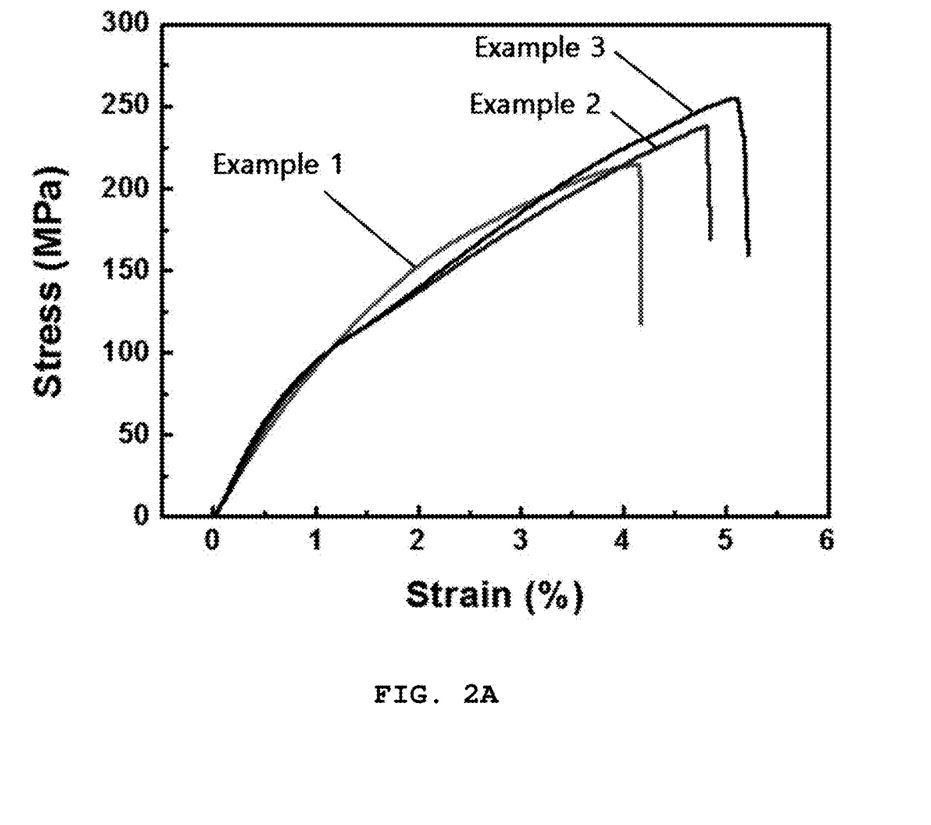
FIGS. 2A to 2D show the results of tensile tests on polyamide/hybrid carbon filler composite specimens produced in Examples 1-3 and Comparative Examples 1-7.
Figure 2B:
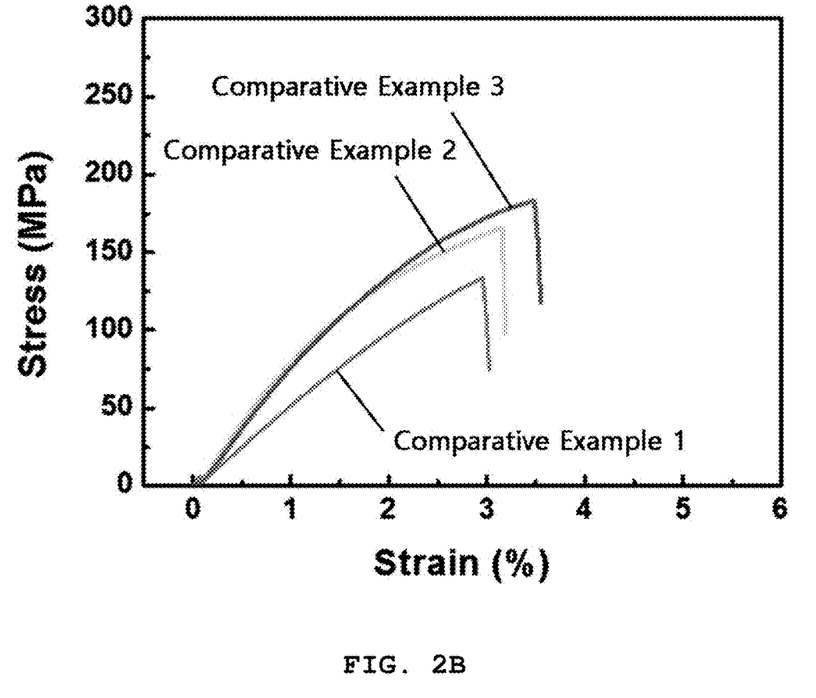
Figure 2C:
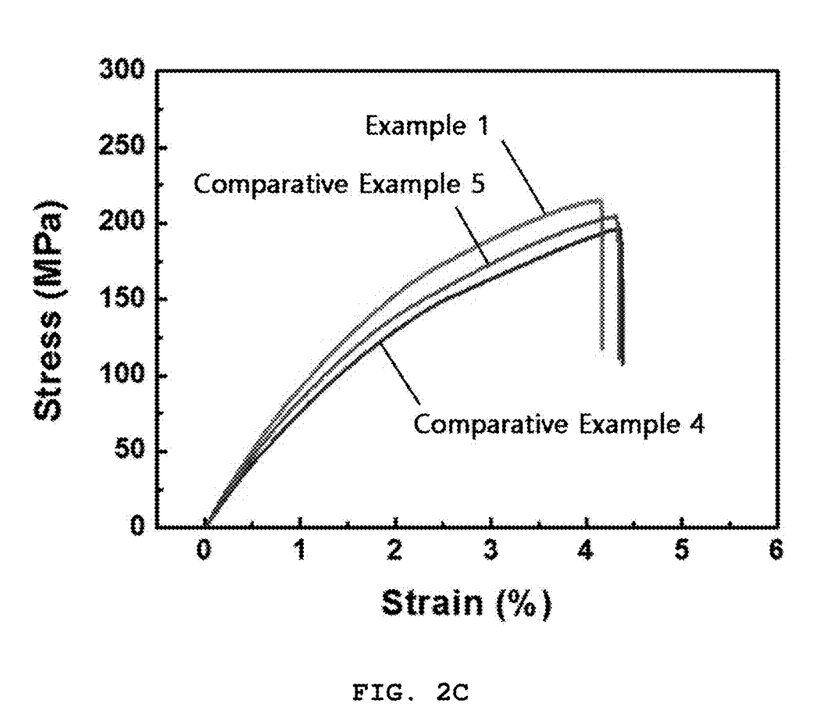
Figure 2D:
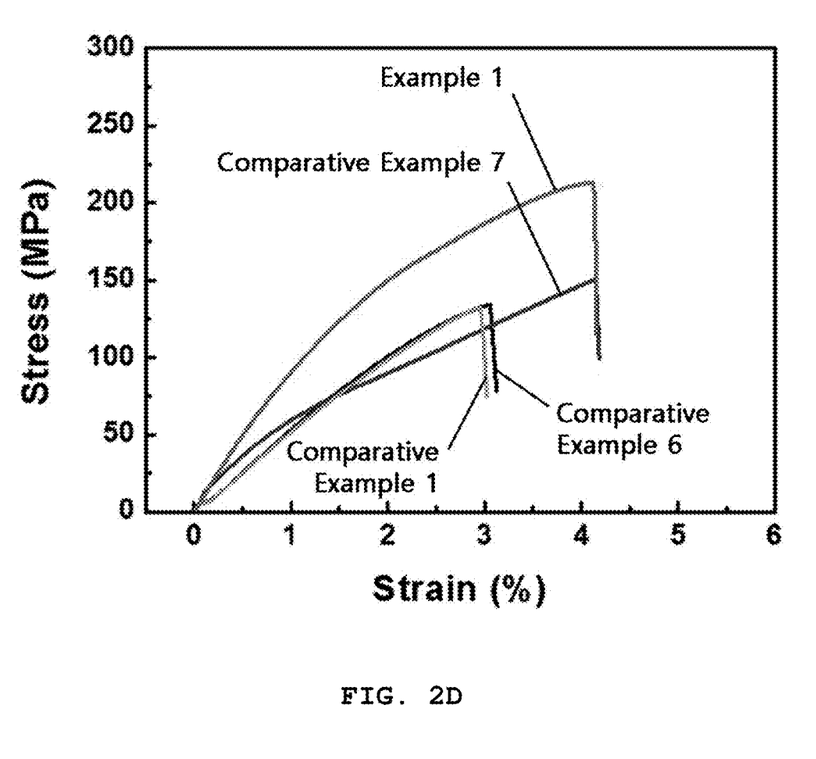
Figure 3:
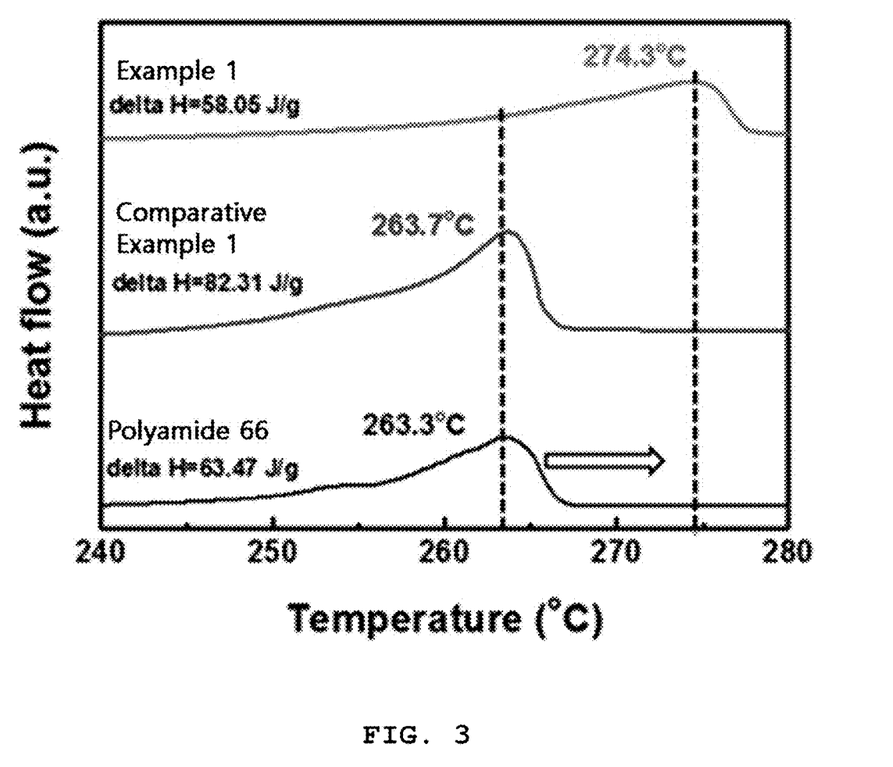
FIG. 3 shows differential scanning calorimetry (DSC) curves of polyamide/hybrid carbon filler composite specimens produced using fixed amounts of a nano carbon and a carbon fiber by different compounding processes in Example 1 and Comparative Example 1.

FIG. 3 confirms that the specimen of Example 1 had a melting point higher by ~11° C. than that of the specimen of Comparative Example 1. The specimen of Example 1 had a lower melting energy than pure polyamide 66 or the specimen of Comparative Example 1, demonstrating that partial cleavage of the main chain of the polymer led to a reduction in crystallinity, and as a result, mechanochemical bonds were newly formed. Therefore, the higher melting point of the composite of Example 1 is believed to be because bonds were formed as a result of increased affinity and interaction between the polyamide 66 and the hybrid carbon filler.

Test Example 3: Dynamic Mechanical Analysis

The glass transition temperatures of the polyamide 66/hybrid carbon filler composites of Example 1 and Comparative Example 1 were measured by dynamic mechanical analysis. The results are shown in FIG. 4.

Figure 4:
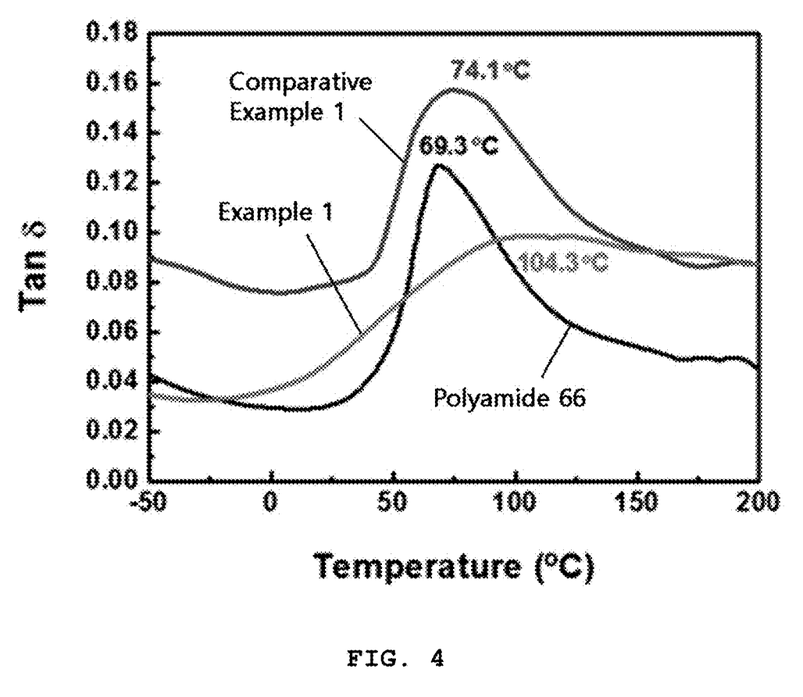
FIG. 4 shows the results of dynamic mechanical analysis (DMA) on polyamide/hybrid carbon filler composite specimens produced using fixed amounts of a nano carbon and a carbon fiber by different compounding processes in Example 1 and Comparative Example 1.

As is obvious from FIG. 4, the glass transition temperature of the specimen of Example 1 was higher by ~30° C. than that of the specimen of Comparative Example 1. The higher glass transition temperature of the composite of Example 1 is believed to be because bonds were formed as a result of increased affinity and interaction between the polyamide 66 and the hybrid carbon filler.

Test Example 4: Fourier Transform Infrared Spectroscopy

Figure 5:
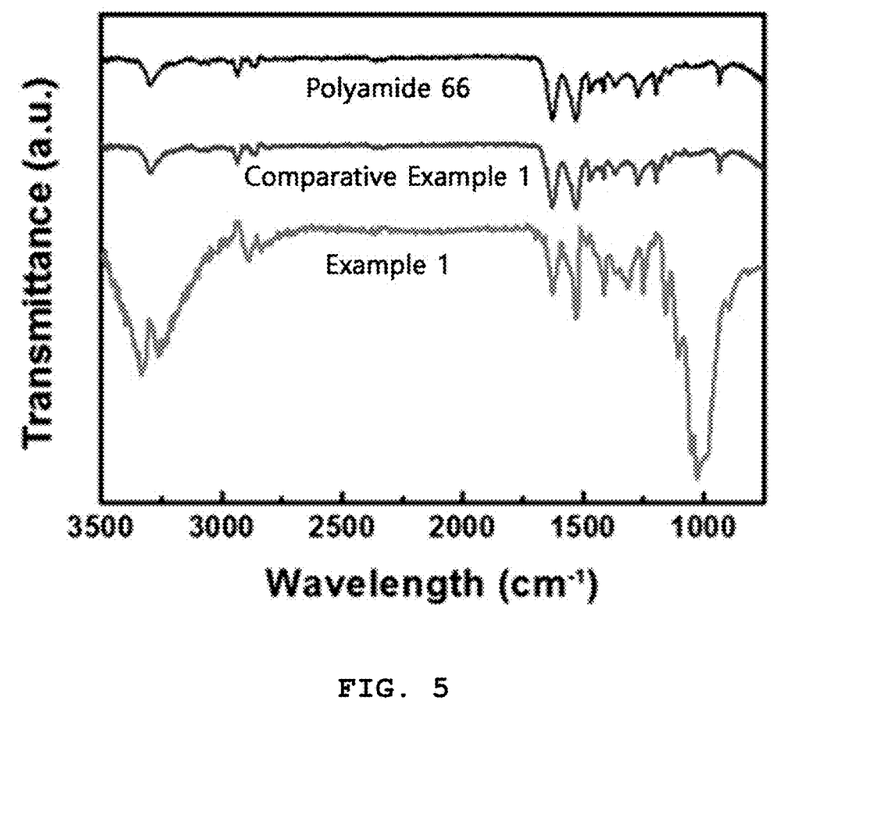
FIG. 5 shows Fourier transform infrared (FT-IR) spectra of polyamide/hybrid carbon filler composite specimens produced using fixed amounts of a nano carbon and a carbon fiber by different compounding processes in Example 1 and Comparative Example 1.

The specimens of Example 1 and Comparative Example 1 were analyzed by Fourier transform infrared spectroscopy to confirm whether bonds between the polyamide 66 and the hybrid carbon filler were formed by mechanofusion and plasma treatments. The results are shown in FIG. 5.

New peaks appeared in the infrared spectrum of the specimen of Example 1 but were not observed in the infrared spectrum of pure polyamide 66. These peaks are believed to result from the formation of new mechanochemical bonds between the polyamide 66 and the hybrid carbon filler by mechanofusion and plasma treatments. In contrast, the specimen of Comparative Example 1 showed the same infrared spectrum as pure polyamide 66. This is believed to be because no mechanochemical bonds were formed between the polyamide 66 and the hybrid carbon filler in the composite of Comparative Example 1.

Test Example 5: Scanning Electron Microscopy

The interfaces between the polyamide 66 and the carbon filler in the specimens of Example 1 and Comparative Example 1 were compared to demonstrate the improved interfacial affinity caused by the formation of mechanochemical bonds between the polyamide 66 and the hybrid carbon filler in the specimen of Example 1, which was analyzed in Test Examples 1, 2, 3, and 4. The results are shown in FIGS. 6A and 6B.

FIGS. 6A and 6B show fractured surfaces of the specimens produced in Comparative Example 1 and Example 1, respectively. FIG. 6A shows that because of poor interfacial affinity between the resin and the filler in the specimen having not undergone mechanofusion and plasma treatments, the surface of the carbon fiber was relatively smooth and voids were observed at the interface. In contrast, FIG. 6B shows that due to improved interfacial affinity between the resin and the filler in the fractured surface of the specimen of Example 1, the polymer adhered to the surface of the carbon fiber and no voids were observed at the interface. In conclusion, the mechanofusion and plasma treatments lead to an increase in interfacial affinity.

The above results conclude that the conventional compounding process using a Henschel mixer, a roll mill or a pin mill failed to achieve high affinity between the polyamide 66 and the nano carbon-carbon fiber and caused poor mechanical properties of the polyamide 66/nano carbon-carbon fiber composite.

In contrast, the compounding process based on both mechanofusion and plasma treatments ensured the formation of strong mechanochemical bonds between the polyamide 66 and the hybrid carbon filler in the composite. Such mechanochemical bonds were helpful in uniformly dispersing the filler in the composite and improved the interfacial affinity between the polymer and the filler, leading to a marked improvement in the tensile strength and tensile strain of the composite.

What is claimed is:

1. A method for preparing a polyamide-carbon filler composite, comprising simultaneously subjecting a mixture of a polyamide and a carbon filler to mechanofusion and plasma treatments wherein the mechanofusion treatment is performed by rotating the mixture of polyamide and carbon filler at lower than atmospheric pressure.

2. The method according to claim 1, wherein the plasma treatment is performed by applying a voltage to a chamber for the mechanofusion treatment.

3. The method according to claim 2, wherein the pressure is from 100 to 1,000 Pa, the mixture is rotated at a speed from 100 to 5,000 rpm, the voltage is from 0.5 to 5 kV, and the mechanofusion and plasma treatments are performed for 5 to 30 min.

4. The method according to claim 3, wherein the mechanofusion and plasma treatments are performed in an atmosphere of a gas selected from nitrogen, air, argon, oxygen, and mixed gases thereof.

5. The method according to claim 4, wherein the carbon filler is selected from a carbon fiber alone or a mixture of a carbon fiber and a nano carbon.

6. The method according to claim 5, wherein the polyamide, the carbon fiber, and the nano carbon are present in amounts of 46 to 94% by weight, 5 to 50% by weight, and 0.1 to 5% by weight, respectively.

7. The method according to claim 6, wherein the polyamide, the carbon fiber, and the nano carbon are present in amounts of 59 to 89% by weight, 10 to 40% by weight, and 0.5 to 1.5% by weight, respectively.

8. The method according to claim 7, wherein the polyamide, the carbon fiber, and the nano carbon are present in amounts of 59 to 74% by weight, 25 to 40% by weight, and 0.5 to 1.5% by weight, respectively.

9. The method according to claim 8, wherein the polyamide, the carbon fiber, and the nano carbon are present in amounts of 66 to 72% by weight, 27 to 33% by weight, and 0.5 to 1.5% by weight, respectively.

10. The method according to claim 5, wherein the pressure is from 300 to 1,000 Pa, the rotational speed is from 1,000 to 5,000 rpm, and the voltage is from 0.8 to 2.5 kV, the mechanofusion treatment and the plasma treatment are performed in a nitrogen atmosphere, the carbon filler is a mixture of a carbon fiber and a nano carbon, and the polyamide, the carbon fiber, and the nano carbon are mixed in amounts of 59 to 74% by weight, 25 to 40% by weight, and 0.5 to 1.5% by weight, respectively.

* * * * *